US006994137B2

(12) United States Patent
Sandstrom

(10) Patent No.: US 6,994,137 B2
(45) Date of Patent: Feb. 7, 2006

(54) TIRE WITH COMPONENT OF CARBON BLACK RICH RUBBER COMPOSITION WHICH CONTAINS ALKYLPHENOXYPOLY (ALKYLENEOXY) ALKANOL

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 88 days.

(21) Appl. No.: 10/133,547

(22) Filed: Apr. 26, 2002

(65) Prior Publication Data

US 2003/0201049 A1    Oct. 30, 2003

(51) Int. Cl.
*B60C 1/00*     (2006.01)
*B60C 11/00*    (2006.01)
*B60C 13/00*    (2006.01)
*B60C 15/00*    (2006.01)

(52) U.S. Cl. ............... 152/525; 152/450; 152/547; 152/905; 152/DIG. 12

(58) Field of Classification Search ............... 152/525, 152/209.5, 547, 524, DIG. 12
See application file for complete search history.

(56) References Cited

U.S. PATENT DOCUMENTS 4,452,939 A * 6/1984 Parker et al. ............... 524/551
5,178,676 A * 1/1993 Lackey et al. ......... 106/287.14
5,744,536 A * 4/1998 Matsui et al. ............... 524/492

FOREIGN PATENT DOCUMENTS

EP      733673       9/1996
JP      05194790   * 8/1993

OTHER PUBLICATIONS www.The Chemistry Store.com, Feb. 19, 2001.*
"Surfactants" by Rhone-Poulenc, 7500 Prospect Plans Road, Cranbury, New Jersey 08512.
Patent Abstracts of Japan, XP-002271747, Patent No. 200063566, Published Feb. 29, 2000.
Patent Abstracts of Japan, XP-002271749, Patent No. 5194790, Published Aug. 3, 1993.
Patent Abstracts of Japan, XP-002271748, Patent No. 10147668, Published Jun. 2, 1998.
European Search Report.

* cited by examiner

*Primary Examiner*—Jeff H. Aftergut
*Assistant Examiner*—Justin Fischer
(74) *Attorney, Agent, or Firm*—Henry C. Young, Jr.

(57) ABSTRACT

A pneumatic rubber tire having at least one visually exposed component (e.g. sidewall) comprised of a carbon black reinforced rubber composition and contains a significant amount of at least one alkylphenoxypoly(alkyleneoxy) alkanol. Such tire component particularly contains a film thereof on a visually observable outer surface thereof Such tire component may be, for example, at least a portion of a tire sidewall.

3 Claims, No Drawings

US 6,994,137 B2

TIRE WITH COMPONENT OF CARBON BLACK RICH RUBBER COMPOSITION WHICH CONTAINS ALKYLPHENOXYPOLY (ALKYLENEOXY) ALKANOL

FIELD OF THE INVENTION

A pneumatic rubber tire having at least one visually exposed component (e.g. sidewall) comprised of a carbon black reinforced rubber composition and contains a significant amount of at least one alkylphenoxypoly(alkyleneoxy) alkanol. Such tire component particularly contains a film thereof on a visually observable outer surface thereof. Such tire component may be, for example, at a least a portion of a tire sidewall.

BACKGROUND OF THE INVENTION

Pneumatic rubber tires conventionally have visually exposed external components of one or more rubber compositions which, when exposed to weathering atmospheric conditions and dynamic use, tend to discolor to various degrees and to provide an external tire appearance which is not typically uniform in nature. For example, a black colored tire sidewall may tend to become brown in color as a result of migration of antidegradants to the surface of the rubber composition, together with exposure to atmospheric ozone, ultraviolet light and weathering in general. Such phenomena are well known to those having skill in such art.

When a tire is initially manufactured, the associated tire molding surface conventionally provides an attractive appearance for the surface of the entire tire.

As the tire naturally ages, or is used, under atmospheric conditions, the appearance of a tire sidewall, for example, conventionally becomes somewhat duller in nature due to atmospheric elements such as exposure to ozone and ultraviolet light. Also, the visually appearing tire sidewall conventionally often becomes somewhat discolored, due to migration of, for example, rubber processing oil(s), particularly aromatic rubber processing oils, which may be contained within the rubber composition of the tire component, as well as migration of paraffinic or microcrystalline waxes, if used, and to some extent staining antidegradants, if used, to the exposed surface of the rubber composition of a visually exposed component of the tire.

Such tire components having visually exposed surfaces may be, for example, tire sidewalls, tire chafers, and tire treads, or individual portions thereof.

According to this invention, a method is provided for masking, retarding, and possibly essentially eliminating for an extended period of time, such dulling and/or discoloring (usually browning) of the exposed surface of a tire component due to such migration of various ingredients and/or exposure to atmospheric conditions.

It is to be appreciated that this invention is intended to go beyond a simple elimination of one or more offending ingredients, which in and of itself however might result in a degree of reduction of aged degradation of the visible surface of the rubber component, or perhaps preventing the exposure of the tire to atmospheric conditions which in and of itself would be difficult to accomplish.

In practice, this invention relies upon an inclusion of one or more selective additives to one or more visually exposed components of a tire (e.g. sidewall) which have one or more visibly exposed surfaces which have a tendency to migrate to a visible surface of the tire component and, also, to thereby form a film, or barrier, preferably a relatively glossy film, on the visible surface of the tire component.

Such additive(s) are desirably characterized by being relatively incompatible with and by not being easily sulfur curable with elastomers, at least diene-based elastomers, as well as being of a relatively low molecular weight and of a relatively low viscosity.

Such additives are desirably characterized by being both non-polar and polar in nature along the chemical molecule. The non-polar portion of the molecule should exhibit limited compatibility with the diene based elastomers, whereas the polar portion will be somewhat incompatible and tend to migrate to the cured rubber surface.

In practice, it is considered herein that such incompatibility of the polar function of the additive(s), in combination of its relatively low molecular weight, relatively low viscosity, and/or relatively low melting point, enhances its tendency to migrate to the visual surface of the tire component and tend to create a continuous film on the surface which can mask the aforesaid discoloration and/or dullness of the surface caused by migration of other ingredients within the rubber composition to its visible surface and exposure to atmospheric elements.

Accordingly, one aspect of the philosophy of this invention is to create and/or maintain an aesthetically appealing visible surface of a respective tire component over an extended period of time by an inclusion of such selective ingredient(s) in the respective rubber composition of selective tire component(s) which has a tendency to migrate to the visible surface of the tire component to substantially mask the effects of migration of rubber processing oils, staining antidegradants or paraffinic waxes and various microcrystalline waxes and effects of atmospheric aging.

In the description of this invention, the term "phr" where used relates to parts by weight of an ingredient per 100 parts by weight of rubber, unless otherwise indicated.

The terms "rubber" and "elastomer" are used interchangeably unless otherwise indicated. The terms "vulcanized" and "cured" are used interchangeably unless otherwise indicated. The terms "compound" and "rubber composition" may be used interchangeably unless indicated.

DISCLOSURE AND PRACTICE OF THE INVENTION

In accordance with this invention, a pneumatic rubber tire is provided having at least one component (e.g. sidewall) with a visually observable outer surface comprised of a carbon black rich rubber composition, which comprises, based on 100 parts by weight rubber (phr);

(A) at least one (preferably about 100 phr) diene-based elastomer, (B) reinforcing filler comprised of
   (1) from about 20 to about 120 phr of carbon black, or
   (2) from about 5 to about 50 phr of carbon black and correspondingly about 5 to about 80 phr of precipitated silica and, preferably, a coupling agent for said precipitated silica having a moiety reactive with hydroxyl groups (e.g. silanol groups) contained on said silica and another moiety interactive with said diene-based elastomer, (C) about 0.5 to about 20 alternately about 1 to about 10 phr, of at least one alkanol selected from alkylphenoxypoly (alkyleneoxy) alkanol of the general formula (I):

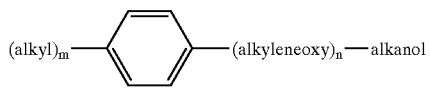

(I)

wherein said alkyl groups are selected from alkyl groups having from 6 to 12 alternately from 8 to 10, carbon atoms and preferably from octyl or nonyl groups; said alkeneoxy groups are selected from ethyleneoxy or propyleneoxy groups, and the number of alkyleneoxy repeat units (n) can vary from an average of about 2 to about 60, desirably from 10 to 50, and more desirably from about 15 to about 45; and m is a value of 1 or 2, preferably 1.

wherein said alkanol group is desirably ethanol or propanol.

The alkylphenoxypoly(alkyleneoxy) alkanols can often be characterized by the weight percent alkylene oxide content thereof which may vary from about 24 to about 90, which desirably is from about 50 to about 87, and more desirably from about 60 to about 73 weight percent.

It is to be appreciated that the alkyphenoxypoly(alkyleneoxy) alkanols are different than conventional poly (ethylene oxides) which do not contain the alkylphenoxy groups in that the poly (ethylene oxide) without alkylphenoxy groups are considered herein to be significantly less compatible with the associated elastomer composition.

It is considered herein that the alkylphenoxy group in the alkylphenoxypoly(alkyleneoxy) alkanol may serve two functions, or purposes, in the present invention. The first is to solubilize the alkylphenoxypoly(alkyleneoxy)alkanol in the tire component rubber composition and thereby aid in its compatibility with the rubber. The second is a tendency to reduce its mobility or tendency to migrate the alkylphenoxypoly(alkyleneoxy) alkanol molecule within the cured rubber of the tire component.

Thus, that the alkylphenoxypoly(alkyleneoxy) alkanol molecule is understood to have a tendency to migrate through the rubber composition to the surface of the tire component rubber composition because of the aforesaid compatibility aspect. However, its tendency to migrate within the rubber composition is somewhat restricted because of the aforesaid nature of the molecule. The tendency to restrict the molecule's ability to migrate within the rubber composition to the visible surface of the cured tire component is considered herein to be beneficial in that a film thereof formed on the surface of the rubber composition is considered herein to tend to aid in adhering the formed film to the rubber component's surface.

Representative of commercial alkylphenoxypoly(alkyleneoxy) alkanols are, for example, Igepal™ CO-850 and Igepal™ CO-890 from Rhodia.

While the mechanism may not be entirely understood, it is believed that the aforesaid alkylphenoxypoly(alkyleneoxy) alkanol(s) migrates to the visual surface of the tire rubber component (e.g. sidewall) to form a substantially continuous, film of relatively consistent molecular weight on the sidewall surface to provide the component's surface with a somewhat glossy, aesthetically appealing, appearance, particularly for a black colored tire component (e.g. portion of a sidewall) where the black color is a result of the carbon black contained in the sidewall rubber composition.

In practice, said visually observable tire component may be, for example and not intended to be limiting, at least a portion of a tire sidewall, at least a potion of a tire tread and at least a portion of a tire chafer which are tire components well known to those skilled in such art and preferably at least a portion of a tire sidewall to the exclusion of the tire tread. Alternatively, the tread may be excluded from such tire components, if desired.

In further accordance with this invention, said tire also contains a film of said alkylphenoxypoly(alkyleneoxy) alkanol on an outer, visible surface of said tire component.

In particular accordance with this invention said tire contains a film of said alkylphenoxypoly(alkyleneoxy) alkanol on an outer, visible surface of said tire component formed by migration thereof from a dispersion thereof within the rubber composition of said component to the outer, visible, rubber surface of said tire component.

In an additional accordance with this invention, said tire contains a film of said alkylphenoxypoly(alkyleneoxy) alkanol on an outer, visible surface of said tire component as a result of said ethoxylated nonyl phenol migration from a dispersion thereof within the rubber composition of said component to the outer, visible, rubber surface of said tire component in a manner to mask an appearance of rubber processing oil contained within the rubber composition of said tire component which has also migrated to a visible surface thereof.

In the practice of this invention, the carbon black rich rubber composition, which also may contain, if desired, precipitated silica (e.g. synthetic amorphous precipitated silica having hydroxyl groups on the surface thereof), is used for the visually observable tire component in which the aforesaid alkylphenoxypoly(alkyleneoxy) alkanol material migrates to a visible surface of the tire rubber component to form a film on said visible surface (e.g the outer surface of a tire sidewall).

Representative silicas are, for example, silicas from PPG Industries as HiSil 210, silicas from Rhodia as Zeosil165GR and Zeosil 1165MP, silicas from Degussa and from J. M. Huber.

Representative of silica coupling agents are, for example, bis(3-trialkylsilylalkyl) polysulfides having an average of from 2 to 2.6 or from 3.5 to 4 sulfur atoms in its polysulfidic bridge such as, for example bis(3-triethoxysilylpropyl) polysulfide.

In another aspect of the invention, it may be desired that the tire component is at least a portion of the sidewall to the exclusion of the tire tread because a film formed on the outer surface of a tread is readily abraded away as the tire rolls on the ground.

For the purposes of this description, the "compounded" rubber compositions refer to the respective rubber compositions which have been compounded with appropriate compounding ingredients such as, for example, carbon black, oil, stearic acid, zinc oxide, silica, wax, antidegradants, resin(s), sulfur and accelerator(s) as well as the aforesaid alkylphenoxypoly(alkyleneoxy) alkanol, particularly the aforesaid Igepal CO-850 and Igepal CO-890.

In the practice of this invention, the rubber composition of said tire component may be comprised of a diene-based elastomer selected from, for example, polymers and copolymers of at least one of isoprene and 1,3-butadiene and copolymers of styrene and/or alpha methylstyrene with at least one of isoprene and 1,3-butadiene and may include an EPDM rubber (ethylene/propylene/conjugated diene rubber terpolymer).

The selection of elastomers for a particular visible tire component will depend somewhat upon which tire component is involved which may be, for example, a tire sidewall or a portion of a sidewall.

The elastomers for a particular visible tire component may be selected from, for example, one or more of diene-based cis 1,4-polyisoprene rubber (natural or synthetic), cis 1,4-polybutadiene rubber, styrene/butadiene copolymer rubbers (whether prepared by solvent solution of aqueous emulsion polymerization, styrene/isoprene/butadiene terpolymer rubbers, isoprene/butadiene copolymer rubber, high vinyl polybutadiene rubber having a vinyl 1,2-content in a range of from about 30 to about 90 percent, trans 1,4-polybutadiene rubber and 3,4-polyisoprene rubber. Preferably it is comprised of a combination of natural rubber or synthetic cis 1,4-polyisoprene rubber and cis 1,4-polybutadiene rubbers. It may also be comprised of or contain butyl, halobutyl and/or EPDM rubber.

In practice, the rubber composition may contain a tin and/or silicon coupled, preferably tin coupled, diene-based elastomer prepared by organic solvent polymerization in the presence of a suitable tin-based catalyst complex of at least one of isoprene and 1,3-butadiene monomers or of styrene together with at least one of isoprene and 1,3-butadiene monomers. Said tin and/or silicon coupled elastomers may be selected from, for example, styrene/butadiene copolymers, isoprene/butadiene copolymers, styrene/isoprene copolymers and styrene/isoprene/butadiene terpolymers. The preparation of tin and silicon coupled elastomers via organic solvent polymerization is well known to those having skill in such art.

In practice, the rubber composition may contain a functionalized diene-based elastomer. For example, a functionalized elastomer may be provided as a diene-based elastomer as described above which contains one or more functional groups such as, for example, one or more hydroxyl groups, carboxyl groups, silanol groups, amine groups and epoxy groups, which are available to participate in reactions with, for example rubber reinforcing fillers such as, for example, carbon black (actually moieties such as for example minor amounts of carboxyl groups on the surface of carbon black), carbon black which contains domains of silica on its surface, amorphous silica, clay (particularly water swellable clay such as for example montmorillonite clay), and starch-based reinforcement. Such functionalized diene-based elastomers, and their preparation, are well known to those having skill in such art.

In practice, the rubber composition may contain a functionalized diene-based elastomer. For example, a functionalized elastomer may be provided as a diene-based elastomer as described above which contains one or more functional groups such as, for example, hydroxyl groups, carboxyl groups, amine groups, epoxide groups and silanol groups which are available to participate in reactions such as for example reactions with, for example, carbon black, carbon black which contains domains of silica on its surface, amorphous silica, clay and starch based reinforcement. Such functionalized diene-based elastomers, and their preparation, are well known to those having skill in such art.

It is readily understood by those having skill in the art that the rubber compositions of the external tire components would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical additions of carbon black may comprise about 20 to 120 parts by weight per 100 parts by weight of diene rubber (phr), preferably 30 to 80 phr. Typical amounts of tackifier resins, if used, may comprise about 0.5 to about 10 phr, usually about 1 to about 5 phr. Typical amounts of processing aids may comprise 1 to 50 phr. Such processing aids may include aromatic, napthenic, and/or paraffinic processing oils. Silica, if used, may be used in an amount of about 5 to about 25 or from 5 to about 80, phr, often with a silica coupling agent. Representative silicas may be, for example, synthetic precipitated silicas. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of specified blends of rubbers in visually observable tire external components (e.g. tire sidewall) as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which the primary accelerator is generally used in the larger amounts, 0.5 to 2 phr, and a secondary accelerator which is generally used in amounts of 0.05 to 0.50 phr in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the utilization of specified ingredients (ethoxylated nonyl phenol) to enhance the aesthetic appearance of the visible surface of a tire.

Sometimes, the combination of zinc oxide, fatty acid, sulfur and accelerator(s) may be collectively referred to as curatives.

Sometimes a combination of antioxidants, antiozonants may be collectively referred to as antidegradants.

The tire can be built, shaped, molded and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

Samples of rubber compositions according to the recipes represented in Table 1 were prepared as being representative sidewall compositions by blending ingredients in a laboratory internal rubber mixer using two separate stages of addition of the ingredients, namely, a first non-productive mix stage and a second productive mix stage where sulfur and accelerator(s) are added.

The Samples are represented in this Example as Control Sample A and Samples B and C. For Samples B and C, alkylphenoxypoly(alkyleneoxy) alkanols were used, respectively, as Igepal™ CO-850 and Igepal™ CO-890 from Rhodia which were substituted for oil or for oil and wax contained in the Control Sample A.

For the preparation of the Samples, in the first, or non-productive internal mixing stage, the ingredients were mixed for about 4 minutes to a drop temperature of about 150° C. In the second or productive mixing stage, sulfur and accelerator(s) were added and mixed for about 2 minutes to a drop temperature of about 110° C.

The cure behavior and various cured physical properties for each composition are shown in Table 2. The samples were individually cured for 12 minutes at about 170° C.

The results of ozone testing, namely static and dynamic ozone testing, of the cured Samples are shown in the following Tables 3 and 4. The general conditions for the ozone testing of the Samples, whether static or dynamic, in terms of ozone concentration, time and temperature, are cited at the top of the respective Tables 3 and 4.

TABLE 1

|  | Control Sample A | Sample B | Sample C |
| --- | --- | --- | --- |
| Non-Productive Mixing (150° C.) |  |  |  |
| Natural rubber | 40 | 40 | 40 |
| Cis 1,4-polybutadiene[1] | 60 | 60 | 60 |
| Carbon black[2] | 50 | 50 | 50 |
| Fatty acid | 1 | 1 | 1 |
| Antiozonant/antioxidants[3] | 5 | 5 | 5 |
| Processing oil[4] | 12 | 9 | 9 |
| Wax[5] | 1 | 0 | 0 |
| Igepal™ CO-850[6] | 0 | 4 | 0 |

TABLE 1-continued

|  | Control Sample A | Sample B | Sample C |
| --- | --- | --- | --- |
| Igepal™ CO-890[7] | 0 | 0 | 4 |
| Phenolic tackifier[8] | 3.5 | 3.5 | 3.5 |
| Productive Mixing (110° C.) |  |  |  |
| Zinc oxide | 3.5 | 3.5 | 3.5 |
| Sulfur and accelerator(s)[9] | 2.7 | 2.7 | 2.7 |

[1]Obtained as BUD® 1207 from The Goodyear Tire & Rubber Company
[2]ASTM N-550
[3]Blend of Santoflex™ 6PPD from Flexsys and Wingstay® 100 from The Goodyear Tire & Rubber Company
[4]Flexon™ 641 from ExxonMobil
[5]Blend of microcrystalline and paraffinic waxes, 2/1 weight ratio m/p
[6]Igepal™ CO-850 (contains 20 moles ethylene oxide) from Rhodia
[7]Igepal™ CO-890 (contains 40 moles ethylene oxide) from Rhodia
[8]SP-1068 from Schenectady
[9]Blend of sulfenamide and guanidine based sulfur cure accelerators In this Example, the fatty acid was primarily stearic acid.

TABLE 2

|  | Control Sample A | Sample B | Sample C |
| --- | --- | --- | --- |
| Processing oil | 12 | 9 | 9 |
| Wax | 1 | 0 | 0 |
| Igepal CO-850 | 0 | 4 | 0 |
| Igepal CO-890 | 0 | 0 | 4 |
| Rheometer, 170° C. |  |  |  |
| Maximum torque (dNm) | 11.3 | 12.6 | 12.7 |
| Minimum torque (dNm) | 2 | 2.2 | 1.8 |
| Delta torque (dNm) | 10.1 | 10.4 | 10.9 |
| T90 (minutes) | 2.9 | 2 | 1.9 |
| Stress-strain |  |  |  |
| Tensile strength (MPa) | 12.5 | 13.2 | 12.4 |
| Elongation at break (%) | 583 | 573 | 547 |
| 300% modulus (MPa) | 4.8 | 5.6 | 5.6 |
| Rebound, % |  |  |  |
| 23° C. | 58 | 57 | 57 |
| 100° C. | 60 | 63 | 63 |
| Hardness (Shore A) |  |  |  |
| 23° C. | 51 | 53 | 53 |
| 100° C. | 47 | 49 | 50 |

TABLE 3

Static Ozone Test
(Variable Strain, 50 pphm Ozone, 48 hours, 40° C.)

|  | Control Sample A | Sample B | Sample C |
| --- | --- | --- | --- |
| Number of cracks | A | O | O |
| Size of cracks | 2 | — | — |
| Appearance after ozone test | Dull | Very shiny | Very shiny |
|  | Slightly brown | Black | Black |

TABLE 4

Dynamic Ozone Test
(Ozone 50 pphm, 48 hours, 40° C., 60% Strain)

|  | Control | | |
| --- | --- | --- | --- |
|  | Sample A | Sample B | Sample C |
| Number of cracks | D | D | D |
| Size of cracks | 1 | 1 | 1 |
| Appearance after ozone test | Dull Slightly brown | Very shiny Black | Very shiny Black |

The following is the key used to report visual observations of the cracks, if any, on the surface of a respective sample:
Number of Cracks
O = None
A = less than ¼ surface
B = ¼ to ½ surface
C = ½ to ¾ surface
D = ¾ to all surface
Size of Cracks
1 = small (hairline)
2 = medium
3 = large
4 = severe (open)

The results presented in Tables 3 and 4 clearly show the benefit of the presence of the alkylphenoxypoly(alkyleneoxy) alkanols in the respective Samples B and C in a cured rubber compound after exposure to static or dynamic ozone resistance.

In particular, when either ethoxylated nonyl phenol is used as a replacement for wax and oil, the tested cured rubber Samples B and C exhibited both blacker appearances and also shinier appearances than the Control Sample A. This appearance difference should translate into a better looking tire when the ethoxylated nonyl phenol is used in one or all of the external components of a cured tire.

It is considered herein that the shinier, blacker appearance of said Samples B and C is due to migration of the ethoxylated nonyl phenol to the surface of the respective Samples.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a sidewall with a visually observable outer surface comprised of a carbon black rich rubber composition, wherein said rubber composition comprises, based on 100 parts by weight rubber (phr) and to the exclusion of paraffin wax;
    (A) at least one diene-based elastomer comprised of cis 1,4-polyisoprene rubber and cis 1,4-butadiene rubber,
    (B) reinforcing filler of from about 30 to about 80 phr of carbon black and about 5 to about 80 phr of precipitated silica, and
    (C) about 1 to about 10 phr of a nonylphenoxypolyethyleneoxy ethanol of the formula (I):

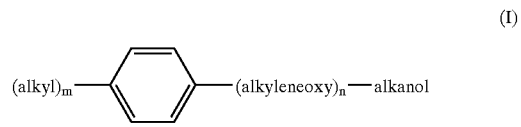

(I)

$(alkyl)_m$—⟨⟩—$(alkyleneoxy)_n$—alkanol wherein the number of ethyleneoxy repeat units (n) is an average of about 20;
wherein said rubber composition contains a coupling agent for said silica having a moiety reactive with hydroxyl groups contained on said silica and another moiety interactive with said diene-based elastomer;
wherein said tire sidewall contains a film of said nonylphenoxypolyethyleneoxy ethanol on an outer, visible surface thereof formed by migration of said nonylphenoxypolyethyleneoxy ethanol from its dispersion in the rubber composition of said component to the outer, visible, rubber surface of said tire component in a manner to mask an appearance of rubber processing oil contained within the rubber composition of said tire component which has also migrated to a visible surface thereof.

2. The tire of claim 1 wherein said coupling agent is a bis (3-trialkylsilylalkyl) polysulfide which contains an average of from 2 to 2.6 or from 3.5 to 4 connecting sulfur atoms in its polysulfidic bridge.

3. The tire of claim 2 wherein said coupling agent is a bis (3-triethoxysilylpropyl) polysulfide.

* * * * *